United States Patent [19]

Trotter

[11] 4,248,004
[45] Feb. 3, 1981

[54] FISHING RIG HOLDER

[76] Inventor: Barry W. Trotter, P.O. Box 2185, Ardmore, Okla. 73401

[21] Appl. No.: 74,088

[22] Filed: Sep. 10, 1979

[51] Int. Cl.³ .............................................. A01K 97/06
[52] U.S. Cl. .............................. 43/54.5 R; 43/57.5 A
[58] Field of Search .......... 43/54.5 R, 54.5 A, 57.5 R, 43/57.5 A

[56] References Cited

U.S. PATENT DOCUMENTS

| | | | |
|---|---|---|---|
| 1,577,566 | 3/1926 | Cryder | 43/57.5 R |
| 2,760,296 | 8/1956 | Faul | 43/57.5 A |
| 4,005,541 | 2/1977 | Henrichsen | 43/57.5 A |
| 4,040,202 | 9/1977 | Wille | 43/57.5 A |

Primary Examiner—Nicholas P. Godici
Attorney, Agent, or Firm—Robert E. Massa

[57] ABSTRACT

A fishing rig holder comprises three panel members foldably connected with ends of the first and third panels connected to the second panel. In folding, the second and third panels swing down and around the first panel. In a folded condition, the panels are stacked planarly with the first panel in the center, covered on one side by the second panel and on the other side by the third panel. The first and third panels include spring-actuated members for holding taut a fishing line, especially taut when the panels are folded in position because the fishing line is on the exterior of the folded panels. Alternate means are provided for maintaining the panels in a planar position when unfolded because otherwise the tension of the line tends to cause the panels to collapse. One of these means is provided by a locking position incorporated into the hinges connecting adjoining panels whereby the panels are locked into position when their ends are abutting. Another means for maintaining the panels in position is by providing one panel member with pegs extending from its end and providing the adjoining panel with receptacles for those pegs. Another means for maintaining the panels in position is by providing adjoining panels with a transverse plate member which is rotatably attached on the same pin as a hinge and which can be swung into position above the adjoining panels.

7 Claims, 11 Drawing Figures

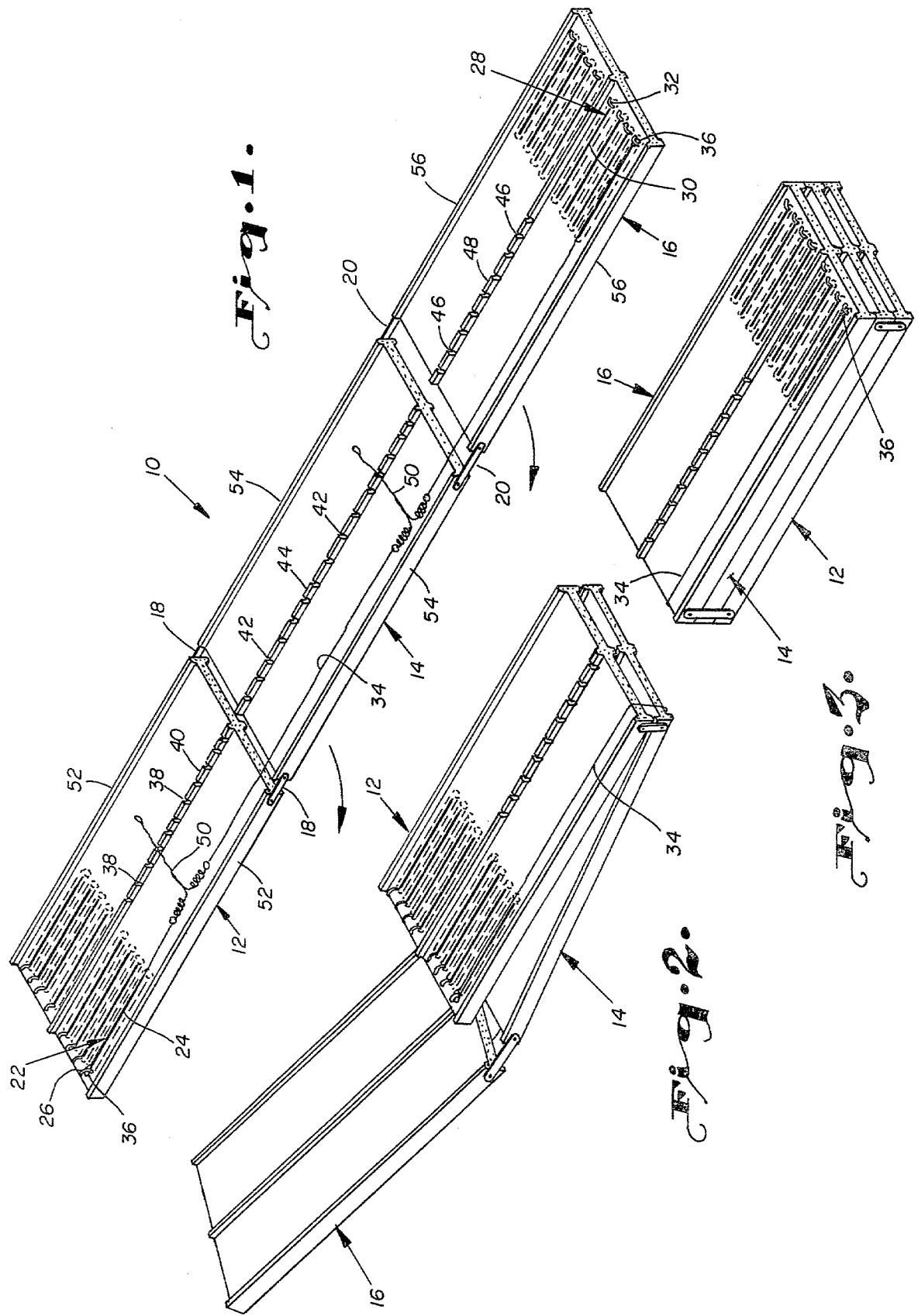

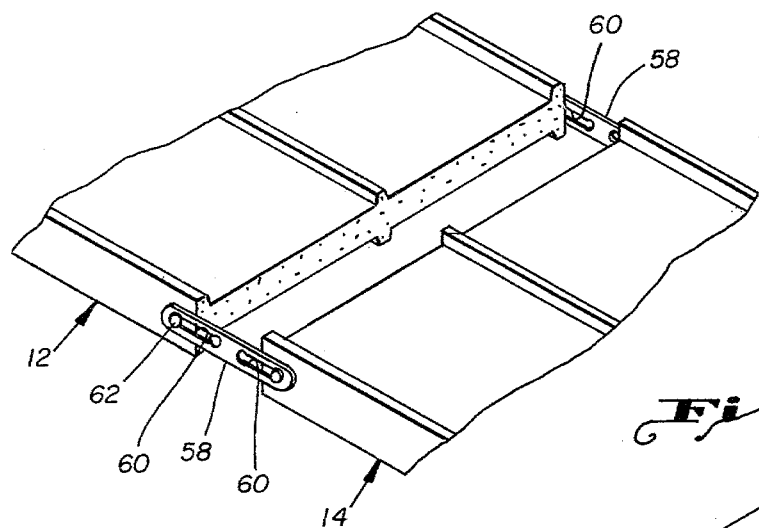
Fig. 4.
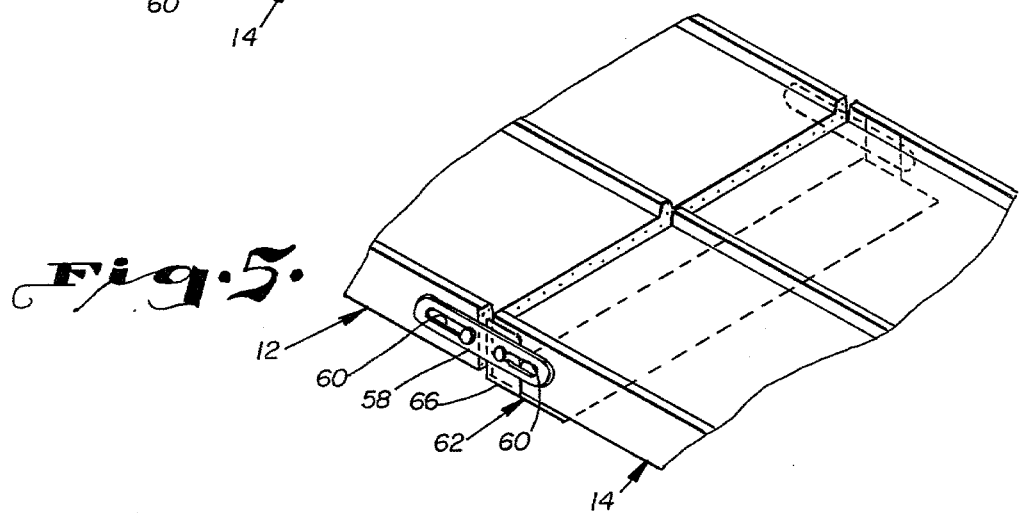
Fig. 5.
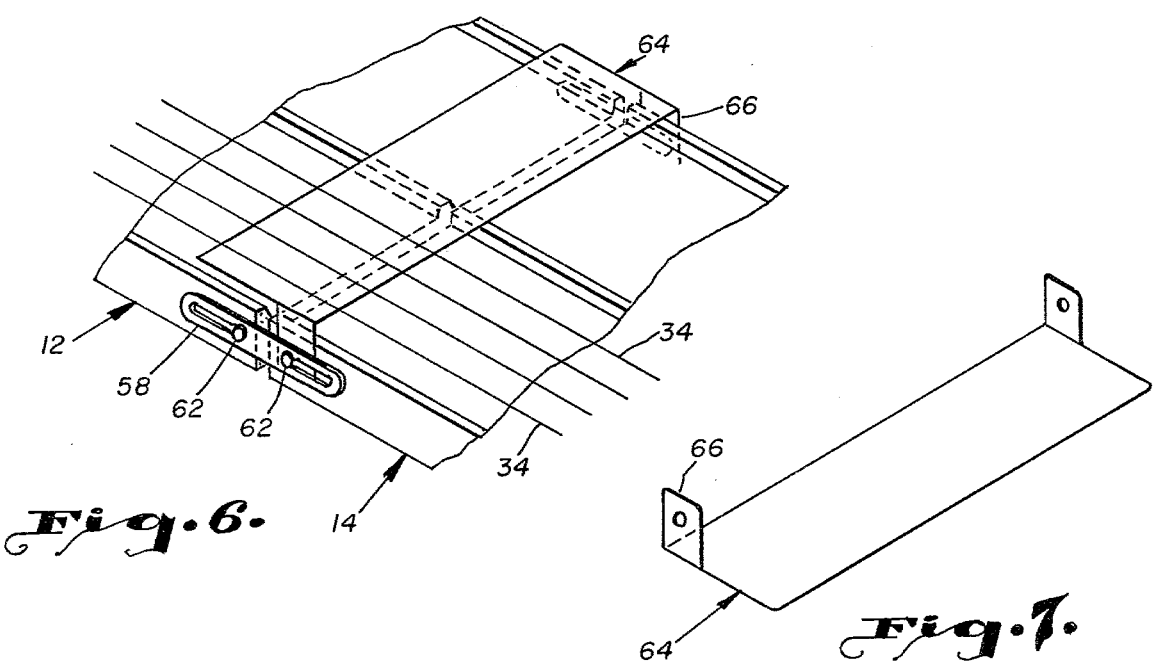
Fig. 6.
Fig. 7.

FISHING RIG HOLDER

BACKGROUND OF THE INVENTION

This invention relates to fishing rig holders. More particularly, this invention relates to fishing rig holders for fishing rigs having multiple leaders.

Various types of holders for fish hooks and special kinds of fishing rigs are known in the prior art. For example, holders for snelled fishing hooks are described in U.S. Pat. Nos. 2,624,973, to Wilcox et al, 2,836,005, to Jerdee, and 3,115,723, to Kline. A folding fishing equipment holder is described in U.S. Pat. No. 3,769,741, to Hessler, and a folding fishing leader tender is described in U.S. Pat. No. 4,005,541, to Henrichsen The devices of the prior art described above seem to be designed primarily to hold fish hook containing lines and lures in safe and convenient protection. Fishermen have traditionally been faced with the inconvenience of storing and carrying fishing equipment attached to lines and leaders because the fine texture of the line, usually almost threadlike, has a strong tendency to cause the line to tangle easily. For the usual short lengths of leaders used as snells, most often 6 to 10 inches, the problem of tangling is not as severe as it is with the longer lines with multiple leaders attached used for special types of fishing, as for crappie fishing. A common crappie rig, whether assembled by the fisherman or a commercial type, will incorporate a fish line or leader of, for example, monofilament nylon 28 to 36 inches long, and a multiplicity of leaders, perhaps 4 or more, of either monofilament line or metal, attached to the fish line. Several of this type of crappie rig will quickly become tangled in a tackle box and cause the fisherman to spend an excessive amount of time untangling them while readying his equipment for fishing.

When fishing for crappie, the fisherman is permitted to use, at least in some states, a number of fishing hooks and leaders on a single line. Consequently, if he were to assemble the hooks, leaders, and lines at the time he arrives at the fishing spot, he would spend a great deal of time in doing so.

But, if the leaders and lines were all neatly assembled and maintained in quickly accessible position, very little time would need be spent in preparing the crappie rig for fishing. He would simply quickly attach the crappie rig to the main fishing line and snap the individual hooks into place.

SUMMARY OF THE INVENTION

Therefore, the primary object of this invention is to provide a fishing rig holder which is easy to construct, safe to use, and economical to manufacture.

Another object of this invention is to provide a fishing rig holder which will permit a fisherman to spend less time assembling his fishing equipment after he arrives at his fishing spot.

Still another object of this invention is to provide a fishing rig holder which will permit a fisherman to store or carry a fishing rig in a neat and orderly condition.

Still another object of this invention is to provide a fishing rig holder which can retain long lengths of fishing line within a compact unit.

These and other objects of the invention will become apparent from the accompanying description and claims which describe the invention as a foldable fishing rig holder comprised of three panel embers connected longitudinally by having ends of the first and third panels connected to the second panel by hinge members, and with the first panel having spring-actuated means near a first end thereof and a series of leader-retaining slots spaced along a center ridge from near a second end of the panel, with the second panel having a series of leader-retaining slots spaced along a center ridge and a first end connected to the first panel, the third panel having spring-actuated means near a first end thereof and a series of leader-retaining slots spaced along a center ridge from near a second end thereof and its second end connected to the second end of the second panel, with the panels being foldable in a manner that a line attached to the spring-actuated means of the first and third panels is held tautly around the exterior of the panels.

The crappie is a fine-tasing fish usually very abundant wherever it is found, and usually appears in schools. Depending mostly upon the temperature of the water, the school of fish will navigate within certain depth limits. Consequently, it has become a custom for a fisherman to assemble a rig which includes a number of hooks spaced along a limited length of the rig in the expectation that he is presenting his bait within the most advantageous layer of water. The crappie fisherman is hoping that several fish will be caught at the same time.

If the fisherman attempts to assemble his own crappie rig by tying the various lengths of leaders or snells to the main line, he would spend a great deal of time at a tedious task, especially if he is already at his fishing site. With my invention he can prepare his fishing rigs ahead of time and be assured that his rigs will be immediately available for quick use.

BRIEF DESCRIPTION OF THE DRAWINGS

In the accompanying drawings:

FIG. 1 is an isometric view of a fishing rig holder according to this invention showing the holder in an unfolded position.

FIG. 2 is an isometric view of a fishing rig holder according to this invention showing the holder in a partially folded position.

FIG. 3 is an isometric view of a fishing rig holder according to this invention showing the holder in a folded position.

FIG. 4 is a partial isometric view of a fishing rig holder according to this invention showing one form of hinge attachment.

FIG. 5 is a partial isometric view of a fishing rig holder according to this invention, similar to FIG. 4, showing a hinge attachment in a closed position.

FIG. 6 is a partial isometric view of a fishing rig holder according to this invention showing one form of means for maintaining the holder in a planar position.

FIG. 7 is an isometric view of the means of maintaining the holder in a planar position described in FIG. 6.

DESCRIPTION OF THE PREFERRED EMBODIMENTS

Figure 8:
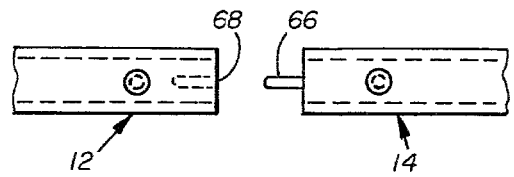
FIG. 8 is a partial side elevation view of another means of maintaining the holder in a planar position.

Referring now to the drawings in detail, FIG. 1 is an isometric view of a fishing rig holder 10, generally, in an open, extended position. Fishing rig holder 10 comprises a first panel member 12, a second panel member 14, and a third panel member 16, swingably and spacedly connected by hinge means, such as hinge members 18 and 20, respectively. Hinge members 18 and 20 preferably provide sufficient space between the panel members so that the panel members may swing around, as shown in an intermediate position in FIG. 2, to a fully closed and compact position as shown in FIG. 3.

First panel member 12 includes spring-actuated means 22, generally, near a first end of the panel member, and includes a slot 24 to permit movement of a holding member, such as a hook 26, and spring means (not shown) preferably beneath the panel. Third panel member 16 includes a similar spring-actuated means 28, generally, near a first end of the panel member, and which also includes a slot 30 to permit movement of a holding member such as a hook 32. Thus, a typical fishing line 34, or rig, may be attached to hooks 26 and 32 and held in a secure, taut position when the rig holder is folded as shown in FIG. 3, and with the line held around the exterior of the panels as shown. A line or rig, such as line 34, may have loops tied in each end, or may have some form of commercially available metal loop or swivel, such as loop 36.

Each of the three panels has a series of leader-retaining slots along a center ridge, such as slots 38 in center ridge 40 of the first panel 12, slots 42 along center ridge 44 of second panel 14, and slots 46 along center ridge 48 of third panel 16. These slots should provide a close, securing fit for a typical line or leader, such as leaders 50, as shown. It is preferable to have the slots 38 and 46 of the first and third panels, respectively, to be spaced from near a second end of each of these panels without the necessity of being spaced adjacent the spring-actuated means of each panel. Although, for convenience, only one line and one pair of leaders is shown in FIG. 1, the multiplicity of the spring-actuated means and slots will provide for a number of lines and leaders, and the spacing of the slots will provide for the varied positioning of the leaders of different sized lines. The slots 42 of the second panel 14 should preferably extend along the length of the center ridge 44.

Each of the three panels has a pair of side walls 52, 54, and 56, respectively, which serve as a form of closure means for the panels when they are folded as in FIG. 3, and as a means of providing space along the panels for the spring-actuated means and lines.

As shown in FIGS. 1, 2, and 3, hinges 18 and 20 provide for spaced attachment of the three panels and allow the panels to fold into position. Alternate means of hinged attachment are shown in FIGS. 4, 5, 6, 10, and 11.

In FIG. 4, hinges 58 include slots 60 which provide for slidable movement of the adjoining panels, as panels 12 and 14. Thus, hinges 58 move slidaby on pins 62. When panels 12 and 14 are moved to the extended position on hinges 58, panel 14 will be able to move spacedly around panel 12. And, when panels 12 and 14 are moved to a closed, or touching position, longitudinally, on hinges 58, then panels 12 and 14 may be more easily held in a planar position, similar to the extended position described in FIG. 1. FIG. 5 describes a closed position of hinges 58, but with some space showing between panels 12 and 14 in order more clearly to describe the operation of the hinge.

FIGS. 5 and 6 also show an alternate form of means for maintaining the panels in a planar position. A plate member 64, generally, is held swingably on pins 62 by flange 66. In FIG. 5 lines 34 are omitted for additional clarity. In the position shown in FIG. 5, plate member 64 permits panels 12 and 14 to swing in relation to each other for folding of the device. But, in the position shown in FIG. 6, when plate member 64 is swung around to a position above panels 12 and 14, and panels 12 and 14 are brought close together, longitudinally, plate member 64 will prevent folding of panels 12 and 14 as may otherwise be induced by the tension of line 34, shown in proper position in FIG. 6.

Figure 9:
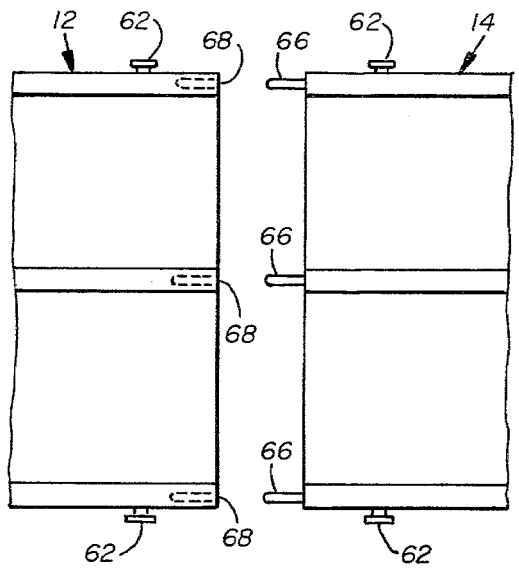
FIG. 9 is a partial top elevation view of the means of maintaining the holder in a planar position described in FIG. 8.

FIGS. 8 and 9 show another means for maintaining the panels, as for example, panels 12 and 14, in a planar position against the tension of the line 34. In FIGS. 8 and 9, hinges 58 are omitted for clarity. One of the panels, such as panel 14, is provided with pins 66, and panel 12 includes receptacles 68 into which pins 66 may fit. When panels 12 and 14 are brought together, pins 66 are pushed into receptacles 68 and the panels are held securely against the tension of line 34.

Figure 10:
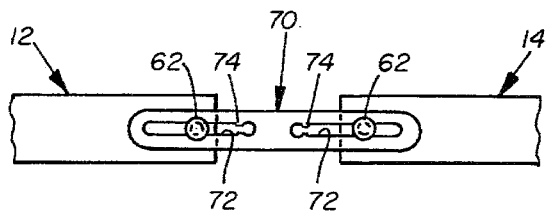
FIG. 10 is a partial side elevation view of another form of hinge means incorporating means for maintaining the holder in a planar position, showing the hinge in an open position.
Figure 11:
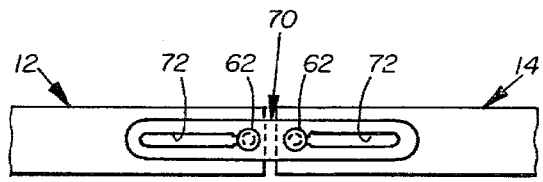
FIG. 11 is a partial side elevation view of the hinge means, as described in FIG. 10, showing the hinge means in a closed position.

FIGS. 10 and 11 show still another means for mtaintaining the panels in a planar position against the tension of line 34. Hinge member 70, generally, includes slots 72 which have restrictions 74 therein into which pins 62 may be forced and locked when the panels are brought together, holding the panels in position against the tension of line 34.

In these descriptions, for brevity, the exemplary panels are described as panels 12 and 14, but may be also panels 14 and 16 as well.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A fishing rig holder, comprising:
   a first, a second, and a third panel member foldably connected, with each of said panel members including side walls and a center ridge,
   said first panel having
      spring-actuated means near a first end thereof, and
      a series of leader-retaining slots spaced along the center ridge from near a second end thereof,
   said second panel having
      a series of leader-retaining slots spaced along the center ridge, and
      a first end connected to the second end of the first panel,
   said third panel having
      spring-actuated means near a first end thereof, and
      a series of leader-retaining slots spaced along the center ridge from near a second end thereof, and
      said second end connected to a second end of the second panel, with
   the panels being foldable in a manner that a line attached the the spring-actuated means of the first and third panels is held taut around the exterior of the panels.

2. A fishing rig holder as described in claim 1 which includes means to maintain the panels in a planar position.

3. A fishing rig holder as described in claim 2 in which the panels are foldably connected by means of hinge members.

4. A fishing rig holder as described in claim 3 in which each member of at least one pair of hinge members includes an elongated slot to permit spaced movement of adjoining panels.

5. A fishing rig holder as described in claim 3 in which each hinge member includes a pair of elongated slots and each slot includes a restrictive portion for securing a pin to provide one means to maintain the panels in a planar position.

6. A fishing rig holder as described in claim 2 in which the means to maintain the panels in a planar position includes a plate member swingably attached to one of adjoining panels and is adaptable to swing into a position above the adjoining panels and prevent a collapsing movement of the panels when under tension from said line.

7. A fishing rig holder as described in claim 2 in which the means to maintain the panels in a planar position includes a pin member in one of a pair of adjoining panels adaptable to fit into an aligned receptacle in the other of said panels.

* * * * *